United States Patent
Chen et al.

(10) Patent No.: US 9,766,720 B2
(45) Date of Patent: Sep. 19, 2017

(54) NAVIGATION APPARATUS AND RELATED ACTUATING METHOD

(71) Applicant: PixArt Imaging Inc., Hsin-Chu (TW)

(72) Inventors: Chun-Chen Chen, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 93 days.

(21) Appl. No.: 14/070,570

(22) Filed: Nov. 3, 2013

(65) Prior Publication Data

US 2015/0009147 A1 Jan. 8, 2015

(30) Foreign Application Priority Data

Jul. 2, 2013 (TW) .................................. 102123664

(51) Int. Cl.
| | | |
|---|---|---|
| *G06F 3/0354* | (2013.01) | |
| *G06F 3/038* | (2013.01) | |
| *G06F 1/32* | (2006.01) | |

(52) U.S. Cl.
CPC ........ *G06F 3/03543* (2013.01); *G06F 1/3259* (2013.01); *G06F 3/038* (2013.01); *Y02B 60/1253* (2013.01)

(58) Field of Classification Search
None
See application file for complete search history.

(56) References Cited

U.S. PATENT DOCUMENTS 6,703,599 B1 * 3/2004 Casebolt et al. .............. 250/221
9,201,543 B2 * 12/2015 Chen ..................... G06F 1/3259

* cited by examiner

*Primary Examiner* — Kenneth B Lee, Jr.
(74) *Attorney, Agent, or Firm* — Winston Hsu

(57) ABSTRACT

A method capable of detecting position of an object for actuating a navigation apparatus is disclosed in the present invention. The navigation apparatus includes a casing, an optical touch unit and a touch processing unit. The optical touch unit is disposed on an upper surface of the casing. The touch processing unit is disposed inside the casing and electrically connected to the optical touch unit. The actuating method includes outputting an optical detecting signal, receiving an optical reflecting signal from the object, analyzing the optical reflecting signal to obtain intensity of the optical reflecting signal, determining whether the object is located above the optical touch unit according to the intensity, and switching the touch processing unit into a normal mode when the object is located above the optical touch unit.

21 Claims, 4 Drawing Sheets

NAVIGATION APPARATUS AND RELATED ACTUATING METHOD

BACKGROUND OF THE INVENTION

1. Field of the Invention

The present invention relates to a navigation apparatus and a related actuating method, and more particularly, to a navigation apparatus and a related actuating method capable of detecting position of an object to immediately actuate an operating function.

2. Description of the Prior Art

A conventional optical touch mouse utilizes an optical detector to output a detecting signal to read position of user's finger, and determines a movement of the finger by intensity analysis of a reflecting signal, so as to transform the movement into a control command. The conventional optical touch mouse can be switched into a sleep mode during idle period, and the optical detector outputs the low-frequency detecting signal for energy conservation. When an image captured by the optical detector with the low-frequency detecting signal is varied, the optical touch mouse starts to be operated by the user, and the optical touch mouse is switched into the normal mode to drive the optical detector to output the high-frequency detecting signal.

Drawback of the conventional optical touch mouse is that the low-frequency detecting signal cannot instantly detect user's motion, which means the optical detector may read the image variation when touch operation had been made in a while. The optical detector is switched into the normal mode to increase sampling frequency of the detecting signal after a delayed period, control command generated by the optical touch mouse during the delayed period is ineffective and operation of the optical touch mouse inconvenient. Therefore, design of an optical touch mouse capable of detecting user's motion to immediately actuate an operating function is an important issue in the related industry.

SUMMARY OF THE INVENTION

The present invention provides a navigation apparatus and a related actuating method capable of detecting position of an object to immediately actuate an operating function for solving above drawbacks.

According to the claimed invention, a method of detecting position of an object to actuate a navigation apparatus is disclosed. The navigation apparatus has a casing, an optical touch unit and a touch processing unit. The optical touch unit is disposed on an upper surface of the casing. The touch processing unit is disposed inside the casing and electrically connected to the optical touch unit. The method includes outputting an optical detecting signal, receiving an optical reflecting signal from the object, analyzing the optical reflecting signal to obtain intensity of the optical reflecting signal, determining whether the object is located above the optical touch unit according to the intensity, and switching the touch processing unit into a normal mode when the object is located above the optical touch unit.

According to the claimed invention, a situation of the object located above the optical touch unit includes the object is suspended over the optical touch unit, and the object substantially contacts the optical touch unit.

According to the claimed invention, the method of determining whether the object is located above the optical touch unit includes comparing the intensity with a predetermined value, and determining position of the object relative to the optical touch unit when the intensity is greater than the predetermined value.

According to the claimed invention, the predetermined value includes a first threshold and a second threshold. The second threshold is greater than the first threshold. The object is suspended over the optical touch unit when the intensity is greater than the first threshold and smaller than the second threshold.

According to the claimed invention, the object substantially contacts the optical touch unit when the intensity is greater than the second threshold.

According to the claimed invention, the method further includes inspecting a switch of the navigation apparatus, and determining whether a coordinate detecting unit of the navigation apparatus is switched into a normal mode according to a state of the switch.

According to the claimed invention, a navigation apparatus capable of detecting position of an object to actuate an operating function is disclosed The navigation apparatus includes a casing, an optical touch unit, a touch processing unit, an optical detecting unit and a controller. The optical touch unit is disposed on an upper surface of the casing. The touch processing unit is disposed inside the casing and electrically connected to the optical touch unit. The optical detecting unit is disposed inside the casing. The optical detecting unit outputs an optical detecting signal to detect the object outside the casing, and receives an optical reflecting signal from the object. The controller is electrically connected to the touch processing unit and the optical detecting unit. The controller analyzes the optical reflecting signal to obtain intensity, determines whether the object is located above the optical touch unit according to the intensity, and switches the touch processing unit into a normal mode when the object is located above the optical touch unit.

According to the claimed invention, the navigation apparatus further includes a coordinate detecting unit electrically connected to the controller for detecting coordinates of the navigation apparatus.

According to the claimed invention, the navigation apparatus further includes a switch electrically connected to the controller. The controller determines whether the coordinate detecting unit is switched into a normal mode according to a state of the switch.

The present invention can detect reserved motion of the object (such as the user's hand close to the navigation apparatus) before the navigation apparatus is actually operated, and the touch processing unit can be immediately actuated to increase sampling frequency of the detecting signal. Touch processing function and coordinate detecting function of the navigation apparatus of the present invention are awaked from the sleep mode before the navigation apparatus is actually operated. Without waiting for a delayed period as conventional skill, an effective touch command can be immediately read when the navigation apparatus is touched and an effective control command is generated by varying the coordinates of the navigation apparatus. Comparing to the prior art, the present invention has advantages of simple structural design, low manufacturing cost and easy assembly. The navigation apparatus can immediately detect the user's motion to generate the effective command rapidly for enhanced operational convenience and preferred market competition.

These and other objectives of the present invention will no doubt become obvious to those of ordinary skill in the art

DETAILED DESCRIPTION

Figure 1:
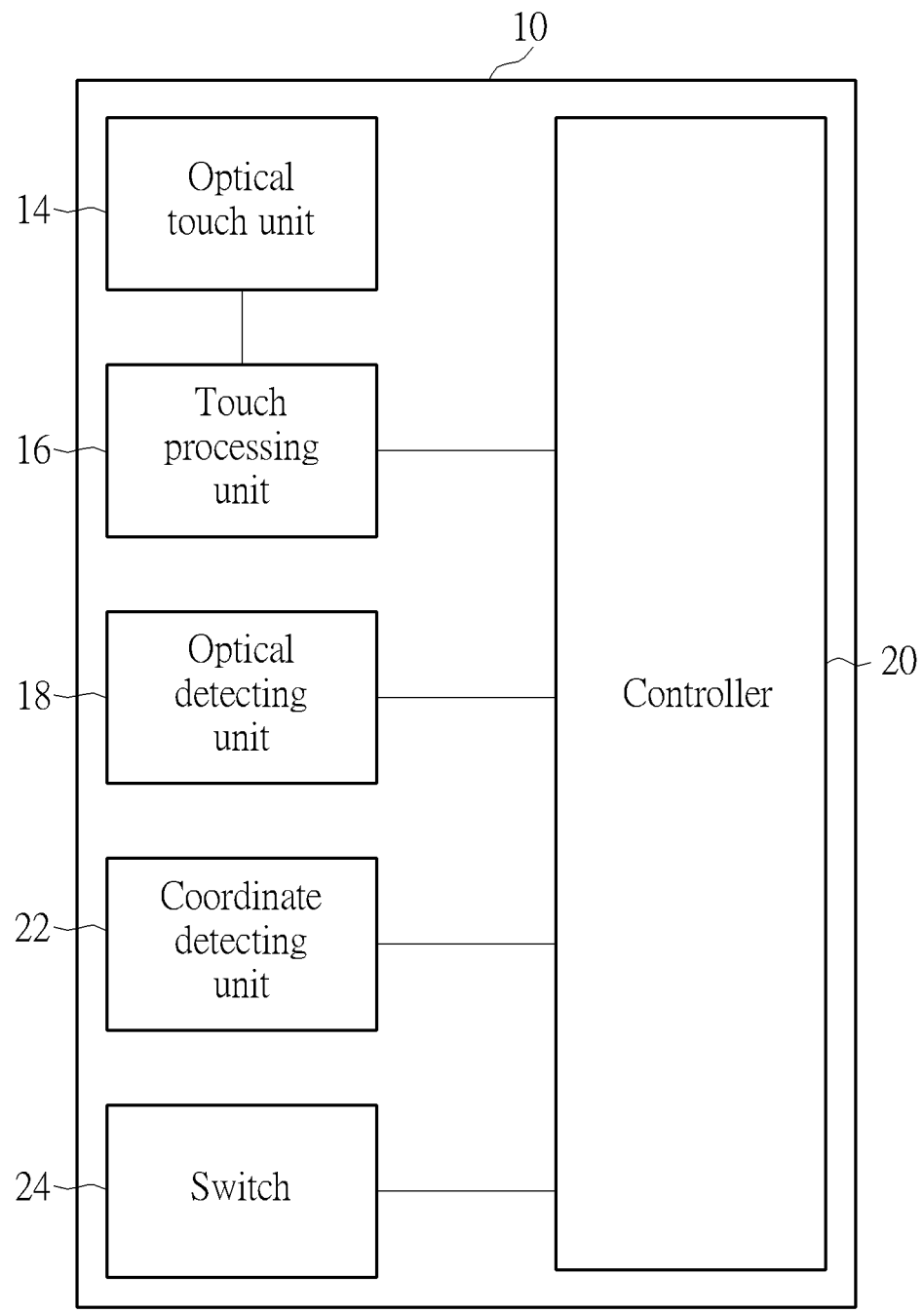
FIG. 1 is a functional block diagram of a navigation apparatus according an embodiment of the present invention.
Figure 2:
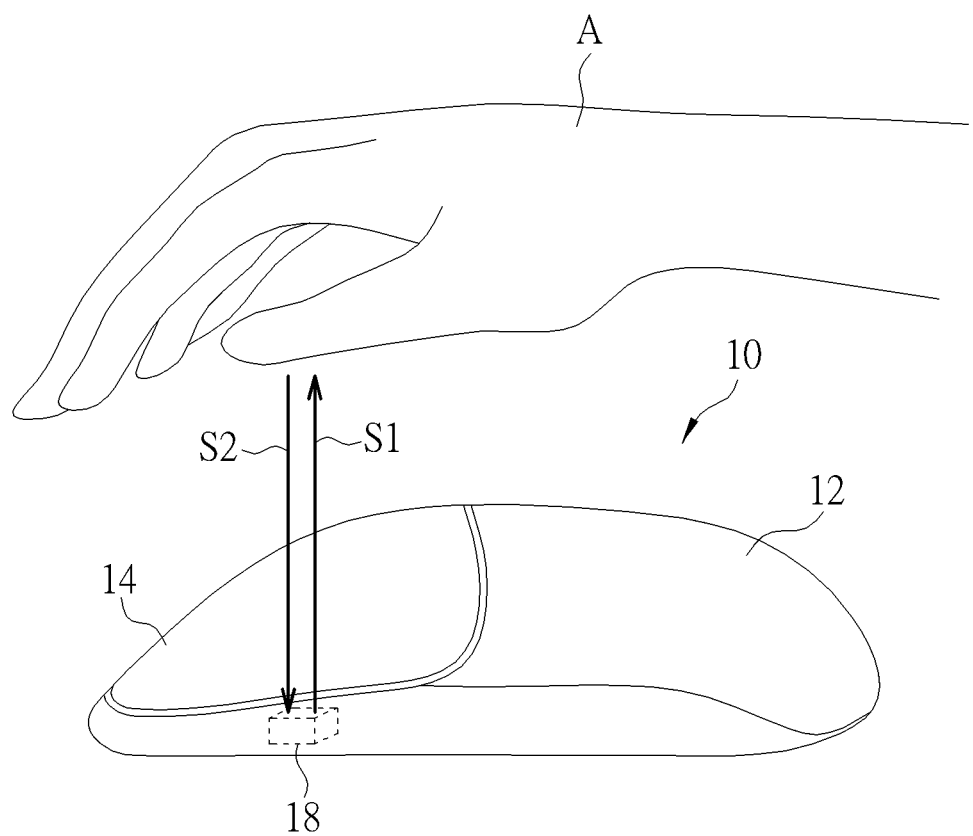
FIG. 2 is a diagram of the navigation apparatus according the embodiment of the present invention.

Please refer to FIG. 1 and FIG. 2. FIG. 1 is a functional block diagram of a navigation apparatus 10 according an embodiment of the present invention. FIG. 2 is a diagram of the navigation apparatus 10 according the embodiment of the present invention. The navigation apparatus 10 can be an optical mouse, and the user holds and pushes the navigation apparatus 10 to generate coordinate variation. The navigation apparatus 10 further can be an optical touch keyboard, an optical trackball and so on. Apparatus utilizing an optical touch function to execute touch detection belongs to scope of the navigation apparatus 10 of the present invention. The navigation apparatus 10 includes an optical touch interface, an operating function of the navigation apparatus 10 can be automatically actuated when the user's hand is close to the optical touch interface without actual contact, which means the navigation apparatus 10 can be auto-switched from a sleep mode to a normal mode for preferred operational convenience.

As shown in FIG. 1 and FIG. 2, the navigation apparatus 10 includes a casing 12, an optical touch unit 14, a touch processing unit 16, an optical detecting unit 18 and a controller 20. The optical touch unit 14 is disposed on an upper surface outside the casing 12. The user can click the optical touch unit 14 or move finger on a surface of the optical touch unit 14 to input the control command. The touch processing unit 16 is disposed inside the casing 12 and electrically connected to the optical touch unit 14. The touch processing unit 16 can analyze and identify user's motion on the optical touch unit 14. The optical detecting unit 18 is disposed inside the casing 12. The optical detecting unit 18 outputs an optical detecting signal S1 to detect an object A (such as fingers or palm of the user) outside the casing 12, and receives an optical reflecting signal S2 reflected from the object A.

It should be mentioned that the optical detecting signal S1 and the optical reflecting signal S2 outputted from and received by the optical detecting unit 18 can penetrate through the optical touch unit 14, which means the optical detecting unit 18 outputs an infrared signal, the optical touch unit 14 is accordingly made of material pervious to infrared. The controller 20 is electrically connected to the touch processing unit 16 and the optical detecting unit 18. The controller 20 can read and analyze the optical reflecting signal S2 from the optical detecting unit 18 to obtain its intensity, and determine position and distance of the object A relative to the optical touch unit 14 according to the intensity, so as to switch the touch processing unit 16 into the sleep mode or the normal mode according to determination. The optical detecting unit 18 can be an electronic component independent of the optical touch unit 14, or the optical detecting unit 18 can be integrated with the optical touch unit 14 monolithically to form an optical detecting module. Property of the signal outputted from the optical detecting unit 18, material of the optical touch unit 14, and combination of the optical touch unit 14 and the optical detecting unit 18 are not limited to the above-mentioned embodiment, and depend on design demand.

As shown in FIG. 1 and FIG. 2, the navigation apparatus 10 further can include a coordinate detecting unit 22 electrically connected to the controller 20. The coordinate detecting unit 22 detects the coordinate variation of the navigation apparatus 10 when the navigation apparatus 10 is moved. In the embodiment, when the optical detecting unit 18 detects the object A is close to the optical touch unit 14, the controller 20 determines the navigation apparatus 10 is ready in use and automatically switches the touch processing unit 16 into the normal mode; when the optical detecting unit 18 detects the object A contacts the optical touch unit 14, the controller 20 determines the navigation apparatus 10 is operated and switches the coordinate detecting unit 22 into the normal mode for detecting movement of the navigation apparatus 10. The coordinate detecting unit 22 can be an optical detecting unit or a roller detecting unit.

Figure 3:
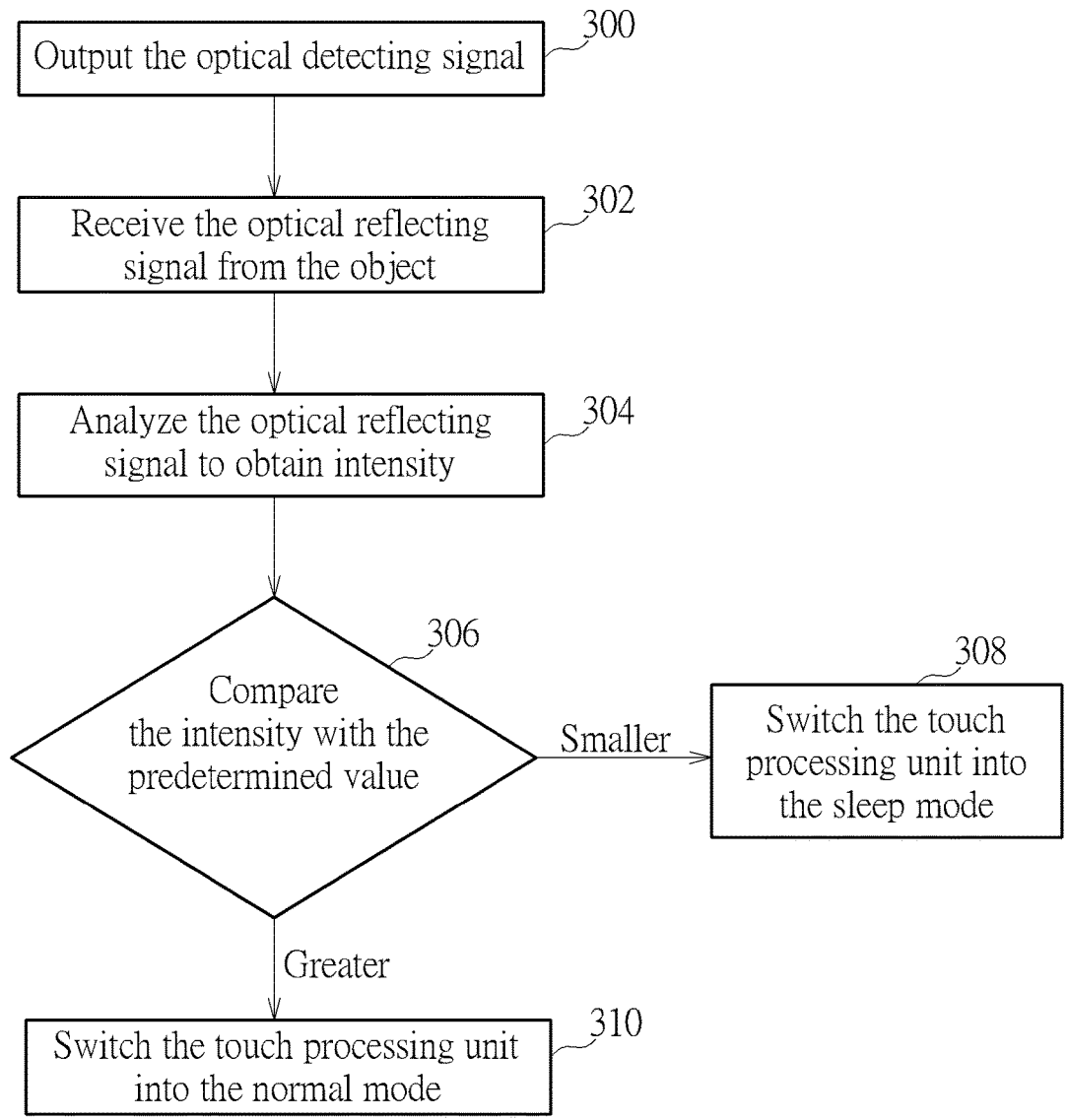
FIG. 3 is a flow chart of actuating the navigation apparatus by position detection of an object according to the embodiment of the present invention.

The navigation apparatus 10 further can include a switch 24 electrically connected to the controller 20. The switch 24 can be software, firmware or hardware. State of the switch 24 can be set by anticipation, to determine whether the coordinate detecting unit 22 of the navigation apparatus 10 is accordingly actuated when the touch processing unit 16 enters the normal mode. For example, the controller 20 detects the switch 24 is at the open state when awaking the touch processing unit 16 to enter the normal mode, the coordinate detecting unit 22 is automatically switched into the normal mode. The controller 20 detects the switch 24 is at the closed state when awaking the touch processing unit 16 to enter the normal mode, the coordinate detecting unit 22 keeps at the present mode (the sleep mode), and the coordinate detecting unit 22 is switched into the normal mode until the optical detecting unit 18 detects that the object A contacts the optical touch unit 14. Besides, the controller 20 further can automatically awake the coordinate detecting unit 22 to enter the normal mode when the navigation apparatus 10 is moved, Please refer to FIG. 3. FIG. 3 is a flow chart of actuating the navigation apparatus 10 by position detection of the object A according to the embodiment of the present invention. The actuating method illustrated in FIG. 3 is suitable for the navigation apparatus 10 shown in FIG. 1 and FIG. 2. First, step 300 is executed that the controller 20 drives the optical detecting unit 18 to output the optical detecting signal S1. The optical detecting signal S1 penetrates the casing 12 through the optical touch unit 14. As nothing is above the casing 12, the intensity of the optical detecting signal S1 is decayed due to outward transmission; As the object A is located above the casing 12, the optical detecting signal S1 is projected onto the object A to generate the optical reflecting signal S2. Then, step 302 and step 304 are executed that the optical detecting unit 18 receives the optical reflecting signal S2, the controller 20 reads and analyzes the optical reflecting signal S2 from the optical detecting unit 18 to obtain the intensity. Intensity variation of the optical signal corresponds to distance between the object A and the optical touch unit 14. For example, the distance between the object A and the optical touch unit 14 is shorter, the intensity of the optical reflecting signal S2 is greater; the distance between the object A and the optical touch unit 14 is longer, the intensity of the optical reflecting signal S2 is smaller.

The controller 20 can determine whether the object A is located above the optical touch unit 14 by intensity analysis of the optical reflecting signal S2. When the object A is not located above the optical touch unit 14, the controller 20 keeps the touch processing unit 16 at the sleep mode, or switches the touch processing unit 16 from the normal mode to the sleep mode. As the controller 20 determines the object A is located above the optical touch unit 14, the object A can be suspended over the optical touch unit 14 or substantially contacts the optical touch unit 14. Therefore, step 306 is executed to compare the intensity with a predetermined value, and the controller 20 determines the position of the object A relative to the optical touch unit 14 according to a comparison.

Figure 4:
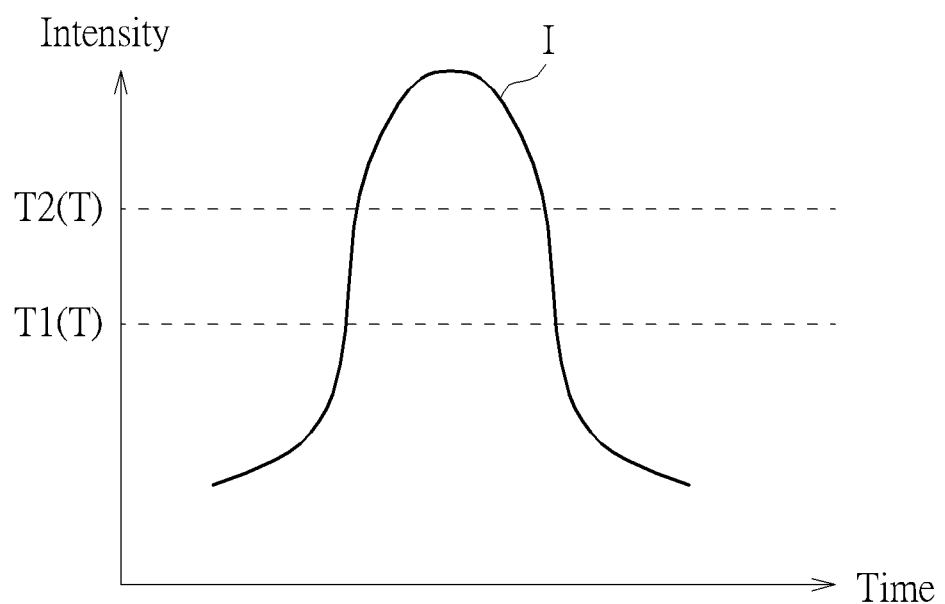
FIG. 4 is a comparative diagram of an intensity and a predetermined value according to the embodiment of the present invention.

Please refer to FIG. 4. FIG. 4 is a comparative diagram of the intensity I and the predetermined value T according to the embodiment of the present invention. The intensity I is maximum intensity of the optical reflecting signal S2 received by the optical detecting unit 18. The predetermined value T can be stored in a built-in memory unit of the controller 20; further, the predetermined value T can be stored in an external memory unit, and the controller 20 connects the external memory unit to read the predetermined value T. In the preferred embodiment of the present invention, the predetermined value T can include a first threshold T1 and a second threshold T2, the second threshold T2 is greater than the first threshold T1. As shown in FIG. 4, when the intensity I is smaller than the predetermined value T (smaller than the second threshold T2 and the first threshold T1), the intensity of the optical reflecting signal S2 is weak, the object A is far from the optical touch unit 14, step 308 is executed to determine the object A is not located above the optical touch unit 14, and the controller 20 keeps the touch processing unit 16 at the sleep mode.

When the intensity I is greater than the predetermined value T, step 310 is executed to determine the object A is located above the optical touch unit 14, and the controller 20 switches the touch processing unit 16 into the normal mode. The present invention can merely actuate the touch processing unit 16, or can simultaneously actuate the touch processing unit 16 and the coordinate detecting unit 22 according to the distance between the object A and the optical touch unit 14. For example, when the intensity I is greater than the first threshold T1 and smaller than the second threshold T2, the controller 20 determines the object A is close to, but not directly contact, the optical touch unit 14; in the meanwhile, the object A is suspended over the optical touch unit 14, the controller 20 switches the touch processing unit 16 into the normal mode to receive the touch command, and the coordinate detecting unit 22 can be selectively at the sleep mode. When the intensity I is increased and greater than the second threshold T2, the controller 20 determines the object A substantially contacts the optical touch unit 14, the touch processing unit 16 and the coordinate detecting unit 22 can be simultaneously switched into the normal mode to respectively receive the touch command and detect the coordinate variation.

In addition, the controller 20 can selectively inspect the switch 24 to determine modes of the coordinate detecting unit 22 when the object A is suspended over the optical touch unit 14. As the object A is suspended over the optical touch unit 14 and the switch 24 is at the closed state, the controller 20 does not switch the coordinate detecting unit 22 and utilizes the optical detecting unit 18 to analyze the intensity I of the optical reflecting signal S2; the coordinate detecting unit 22 is switched into the normal mode when the intensity I is increased to be greater than the second threshold T2. As the object A is suspended over the optical touch unit 14 and the switch 24 is at the open state, the controller 20 can automatically switch the coordinate detecting unit 22 from the sleep mode into the normal mode to detect the coordinate variation of the navigation apparatus 10 even though the object A does not substantially contact the optical touch unit 14.

The navigation apparatus of the present invention utilizes the optical detecting unit to detect the position of the object (the fingers or the palm of the user), and switches the operational mode of each component of the navigation apparatus according to position variation for preferred energy conservation and convenient operation. When the optical detecting unit does not detect the object, the touch processing unit and the coordinate detecting unit of the navigation apparatus can be switched into the sleep mode to economize the energy. When the optical detecting unit detects the object contacts the optical touch unit, the touch processing unit and the coordinate detecting unit can be switched into the normal mode, the navigation apparatus is actuated to detect the user's motion and the coordinate variation. When the optical detecting unit detects that the object is suspended over the optical touch unit and does not substantially contact the optical touch unit, the touch processing unit is switched from the sleep mode into the normal mode to immediately detect motion of the object, the coordinate detecting unit can be switched into the normal mode with actuation of the touch processing unit according to the predetermined state of the switch or further can be actuated when the object substantially contacts the optical touch unit.

Thus, the present invention can detect reserved motion of the object (such as the user's hand close to the navigation apparatus) before the navigation apparatus is actually operated, and the touch processing unit can be immediately actuated to increase sampling frequency of the detecting signal. Touch processing function and coordinate detecting function of the navigation apparatus of the present invention are awaked from the sleep mode before the navigation apparatus is actually operated. Without waiting for a delayed period as conventional skill, an effective touch command can be immediately read when the navigation apparatus is touched and an effective control command is generated by varying the coordinates of the navigation apparatus. Comparing to the prior art, the present invention has advantages of simple structural design, low manufacturing cost and easy assembly. The navigation apparatus can immediately detect the user's motion to generate the effective command rapidly for enhanced operational convenience and preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting position of an object to actuate a navigation apparatus, the navigation apparatus having a casing, an optical touch unit and a touch processing unit, the optical touch unit being disposed on an upper surface of the casing, the touch processing unit being disposed inside the casing and electrically connected to the optical touch unit, the optical touch unit being an optical touchpad comprising an optical detecting unit, the method comprising:
- outputting an optical detecting signal by the optical detecting unit;
- receiving an optical reflecting signal from the object by the optical detecting unit;
- analyzing the optical reflecting signal to obtain intensity of the optical reflecting signal;
- determining whether the object is located above the optical touch unit according to the intensity by detection of the optical touch unit; and
- switching the touch processing unit into a normal mode when the object is located above the optical touch unit, and the touch processing unit analyzing the optical reflecting signal received by the optical detecting unit to determine a control command applied to the navigation apparatus while a finger clicks or slides over the optical touchpad, wherein the control command comprises at least a click command, wherein the optical touch unit and the optical detecting unit are integrated to monolithically form an optical detecting module.

2. The method of claim 1, wherein a situation of the object located above the optical touch unit comprises the object is suspended over the optical touch unit, and the object substantially contacts the optical touch unit.

3. The method of claim 1, wherein the touch processing unit is switched into a sleep mode when the object is not located above the optical touch unit.

4. The method of claim 1, wherein the method of determining whether the object is located above the optical touch unit comprises:
- comparing the intensity with a predetermined value; and
- determining position of the object relative to the optical touch unit when the intensity is greater than the predetermined value.

5. The method of claim 4, wherein the predetermined value comprises a first threshold and a second threshold, the second threshold is greater than the first threshold, and the object is suspended over the optical touch unit when the intensity is greater than the first threshold and smaller than the second threshold.

6. The method of claim 5, wherein the object substantially contacts the optical touch unit when the intensity is greater than the second threshold.

7. The method of claim 4, wherein the object is not located above the optical touch unit when the intensity is smaller than the predetermined value.

8. The method of claim 1, further comprising:
- switching a coordinate detecting unit of the navigation apparatus into a normal mode when the object contacts the optical touch unit.

9. The method of claim 1, further comprising:
- inspecting a switch of the navigation apparatus; and
- determining whether a coordinate detecting unit of the navigation apparatus is switched into a normal mode according to a state of the switch.

10. The method of claim 9, wherein the coordinate detecting unit is switched into the normal mode when the switch is at an open state, and the coordinate detecting unit is not switched into the normal mode when the switch is at a closed state.

11. A navigation apparatus capable of detecting position of an object to actuate an operating function, the navigation apparatus comprises:
- a casing;
- an optical touch unit disposed on an upper surface of the casing, the optical touch unit being an optical touchpad comprising an optical detecting unit, the optical detecting unit outputting an optical detecting signal to detect the object outside the casing, and receiving an optical reflecting signal from the object;
- a touch processing unit disposed inside the casing and electrically connected to the optical touch unit; and
- a controller electrically connected to the touch processing unit and the optical detecting unit, the controller analyzing the optical reflecting signal to obtain intensity, determining whether the object is located above the optical touch unit according to the intensity by detection of the optical touch unit, and switching the touch processing unit into a normal mode when the object is located above the optical touch unit, then the touch processing unit analyzes the optical reflecting signal received by the optical detecting unit to determine a control command applied to the navigation apparatus while a finger clicks or slides over the optical touchpad, wherein the control command comprises at least a click command, wherein the optical touch unit and the optical detecting unit are integrated to monolithically form an optical detecting module.

12. The navigation apparatus of claim 11, wherein the controller further determines that the object is suspended over the optical touch unit or substantially contacts the optical touch unit according to a detecting result.

13. The navigation apparatus of claim 11, wherein the controller further switches the touch processing unit into a sleep mode when the object is not located above the optical touch unit.

14. The navigation apparatus of claim 11, wherein the controller compares the intensity with a predetermined value, and determines position of the object relative to the optical touch unit when the intensity is greater than the predetermined value.

15. The navigation apparatus of claim 14, wherein the predetermined value comprises a first threshold and a second threshold, the second threshold is greater than the first threshold, and the controller determines that the object is suspended over the optical touch unit when the intensity is greater than the first threshold and smaller than the second threshold.

16. The navigation apparatus of claim 15, wherein the controller determines that the object substantially contacts the optical touch unit when the intensity is greater than the second threshold.

17. The navigation apparatus of claim 14, wherein the controller determines that the object is not located above the optical touch unit when the intensity is smaller than the predetermined value.

18. The navigation apparatus of claim 11, further comprising:
- a coordinate detecting unit electrically connected to the controller for detecting coordinates of the navigation apparatus.

19. The navigation apparatus of claim 18, wherein the controller switches the coordinate detecting unit into a normal mode when the object contacts the optical touch unit.

20. The navigation apparatus of claim 18, further comprising:
- a switch electrically connected to the controller, the controller determining whether the coordinate detecting unit is switched into a normal mode according to a state of the switch.

21. The navigation apparatus of claim 20, wherein the controller switches the coordinate detecting unit into the normal mode when the switch is at an open state, and the controller does not switch the coordinate detecting unit when the switch is at a closed state.

* * * * *